United States Patent [19]

Shinonaga et al.

[11] Patent Number: 5,284,681

[45] Date of Patent: Feb. 8, 1994

[54] SURFACE TREATMENT METHOD AND COATING METHOD OF POLYAMIDE RESIN MOLDED ARTICLES

[75] Inventors: Hideo Shinonaga; Kiyoshi Mitsui; Yasuro Suzuki; Satoru Sogabe, all of Chiba, Japan

[73] Assignee: Sumitomo Chemical Co., Ltd., Osaka, Japan

[21] Appl. No.: 968,043

[22] Filed: Oct. 28, 1992

[30] Foreign Application Priority Data

Oct. 30, 1991 [JP] Japan .................................. 3-284652

[51] Int. Cl.$^5$ ............................................. B05D 3/02
[52] U.S. Cl. ................................... 427/316; 264/129; 427/322; 528/499
[58] Field of Search .................... 427/322, 393.5, 316; 264/129, 130; 428/423.5, 474.4; 528/499

[56] References Cited

U.S. PATENT DOCUMENTS 4,340,621 7/1982 Matsumiya et al. ............ 427/322 X
5,185,188 2/1993 Abe et al. .................... 427/393.5 X Primary Examiner—Michael Lusignan
Attorney, Agent, or Firm—Sughrue, Mion, Zinn, Macpeak & Seas

[57] ABSTRACT

A surface treatment method of a polyamide resin composition molded article is disclosed, comprising bringing the surface of a polyamide resin composition molded article into contact with water, said polyamide resin composition molded article comprising (C) 100 parts by weight of a resin composition comprising (A) from 10 to 80% by weight of a polyamide resin and (B) from 20 to 90% by weight of other thermoplastic resin; and (D) from 0 to 20 parts by weight of at least one modifier selected from a carboxylic acid having at least 2 carboxyl groups in the molecule or a derivative thereof, an amine containing at least 2 nitrogen atom in the molecular, urea or a derivative thereof, and a low-molecular weight polyamide. A coating method of a polyamide resin composition molded article is also disclosed, comprising, after bringing the surface of a resin composition molded article into contact with water, coating the surface with a coating composition.

16 Claims, No Drawings

SURFACE TREATMENT METHOD AND COATING METHOD OF POLYAMIDE RESIN MOLDED ARTICLES

FIELD OF THE INVENTION

The present invention relates to a novel surface treating method and coating method of thermoplastic resin composition molded articles which can be utilized as molded articles by injection molding, extrusion molding, etc. More particularly, the invention relates to a novel surface treating method and coating method with excellent coating properties and being tender to the environment by blending a thermoplastic resin composition containing a polyamide resin (hereinafter referred to as "polyamide resin composition") with a modifier, and also to molded articles suitable for electronic parts, electrical parts, and automobile parts such as bumpers, fenders, and wheel covers.

BACKGROUND OF THE INVENTION

Since polyamide resins have excellent properties in heat resistance, rigidity, strength, oil resistance, coating properties, etc., they have widely been used in the fields of automobile parts, electrical and electronic parts as engineering resins. However, the polyamide resins not only involve difficulties and points to be improved in moldability, impact resistance, water resistance, and chemical resistance but also have a high specific gravity and are high in production cost as compared with, for example, polyolefin resins.

In order to improve these drawbacks, a thermoplastic resin composition having a good balance among physical properties such as moldability, rigidity, heat resistance, impact resistance, scratch resistance, oil resistance, chemical resistance, and water resistance and being excellent in uniformity of the appearance and smoothness, formed from polypropylene and a polyamide resin, the both of which are essentially incompatible with each other, by blending an epoxy group-containing copolymer with a polypropylene resin selected from modified polypropylene and a modified polypropylene/polypropylene composition and a polyamide resin to disperse them with good compatibility, is proposed as described, for example, in JP-A-61-64741 (the term "JP-A" as used herein means an "unexamined published Japanese patent application"). However, compositions obtained by blending such a polyamide resin with other resins such as polypropylene resins are not always satisfactory because the coating properties, adhesiveness, and printability which are excellent characteristic features inherent to the polyamide resin are likely lowered. Thus, such a defect is a hindrance in developing new practical applications.

On the other hand, in order to improve the compatibility between a resin having inferior coating properties and a coating composition, a single primer layer is usually used as an interlayer therebetween. However, since not only the cost of the final product is increased owing to a high cost of the primer itself and the addition of one new step, but also an environmental problem is provided by the treatment of the waste solution of the primer, etc., a further improvement has been desired.

Moreover, it is usually practiced well to wash the surface of a resin article with a vapor of a halogenated hydrocarbon solvent such as 1,1,1,-trichloroethane before coating a primer. However, the use of 1,1,1-trichloroethane is being restricted by the ozone problem which is one of the recent environmental measures of the earth.

As a surface pre-treatment for carrying out coating, printing, adhesion, etc., a sand blast treatment, a chromic acid mixture treatment, a corona discharge treatment, a plasma treatment, a surface functional group-imparting method, a surface photografting method, etc., are proposed. However, satisfactory results are not yet obtained in any of these methods from the standpoints of environment, performance, etc.

As described above, the resin composition containing a polyamide involves difficulties in the coating properties, and the use of a primer and the surface pre-treatment for improving the coating properties have various problems from the standpoints of environment, coating performance, etc. Accordingly, the development of resin compositions containing a polyamide, to which coating, adhesion, printing, etc. can be applied well without need of the above-described surface pretreatment step, has become a large technical theme.

SUMMARY OF THE INVENTION

An object of the present invention is, therefore, to provide a surface treating method and coating method of a polyamide resin composition molded article, with a very excellent performance in coating properties and being suitable for the new chemical era without causing problems such as the above-described environmental problems including the environmental problem of the earth.

As the result of various investigations for achieving this object, it has now been found that if the surface of a polyamide resin composition molded article is brought into contact with water, the coating properties of the surface are greatly improved, leading to accomplishment of the present invention.

That is, in one aspect, the present invention relates to a surface treating method of a polyamide resin composition molded article, which comprises bringing the surface of a polyamide resin composition molded article into contact with water, said polyamide resin composition molded article comprising (C) 100 parts by weight of a resin composition comprising (A) from 10 to 80% by weight of a polyamide resin and (B) from 20 to 90% by weight of other thermoplastic resin; and (D) from 0 to 20 parts by weight of at least one modifier selected from a carboxylic acid having at least 2 carboxyl groups in the molecule or a derivative thereof, an amine having at least 2 nitrogen atoms in the molecule, urea or a derivative thereof, and a low-molecular weight polyamide.

In another aspect, the present invention relates to a coating method of a polyamide resin composition molded article, which comprises, after bringing the surface of the aforesaid resin composition molded article into contact with water, coating said surface with a coating composition.

In a further aspect, the present invention relates to a surface treating method of a polyamide resin composition molded article, which comprises bring the surface of a polyamide resin composition molded article into contact with water, said polyamide resin composition molded article comprising 100 parts by weight of a composition comprising 100 parts by weight of the aforesaid composition (C), from 0 to 100 parts by weight of a rubber material and/or a modified rubber material, and from 0.1 to 300 parts by weight of a filler;

and from 0.01 to 20 parts by weight of the aforesaid modifier (D).

In other aspect, the present invention relates to a coating method of a polyamide resin composition molded article, which comprises, after bringing the surface of the aforesaid polyamide resin composition molded article into contact with water, coating said surface with a coating composition.

DETAILED DESCRIPTION OF THE INVENTION

Then, the present invention is described in detail.

[I] Polyamide Resin (A)

The polyamide resin (A) for use in this invention is a polyamide obtained by polycondensation of a lactam having at least 3-membered ring, a polymerizable ω-amino acid, or a dibasic acid and a diamine.

Examples include are polymers of ε-caprolactam, aminocaproic acid, enantholactam, 7-aminoheptanoic acid, 11-aminoundecanoic acid, etc.; and polymers or copolymers obtained by polycondensation of a diamine such as hexamethylenediamine, nonamethylenediamine, undecamethylenediamine, dodecamethylenediamine, and m-xylylenediamine and a dicarboxylic acid such as terephthalic acid, isophthalic acid, adipic acid, sebacic acid, dodecane dibasic acid, and glutaric acid.

Specific examples are aliphatic polyamides such as polyamide 6, polyamide 6,6, polyamide 6,10, polyamide 11, polyamide 12, and polyamide 6,12; and aromatic polyamides such as polyhexamethylenediamine terephthalamide, polyhexamethylenediamine isophthalamide, and xylylene group-containing polyamides. They can be used as a mixture thereof or a copolymer thereof.

[II] Thermoplastic Resin (B)

Other thermoplastic resin (B) for use in this invention is a thermoplastic resin other than the polyamide resin (A).

Preferred examples of other thermoplastic resin (B) are polyolefin resins, polyphenylene resins, and saturated polyester resins.

The polyolefin resins for use in this invention are polyolefins and/or resin compositions containing a polyolefin.

The polyolefin as referred to herein is a crystalline olefin polymer, and specific examples are polymers of an olefin itself and copolymers thereof, such as polypropylene, high-density polyethylene, low-density polyethylene, linear low-density polyethylene, a propylene-ethylene copolymer, an ethylene-butene-1 copolymer, an ethylene-pentene copolymer, an ethylene-hexene copolymer, and poly-4-methylpentene-1; and copolymers of a predominant amount of an olefin and a vinyl monomer copolymerizable with the olefin (e.g., acrylic acid esters, methacrylic acid esters, vinyl acetate, styrene, acrylonitrile, and glycidyl (meth)acrylate). The copolymerization can be carried out by any of random copolymerization, block copolymerization, and graft copolymerization. These polymers can be used singly or as a mixture thereof. Of these polyolefins, polyethylene, and polypropylene are preferable, with polypropylene and a random copolymer or block copolymer of propylene and ethylene being particularly preferable.

These polyolefins are produced by known methods, e.g., the methods described in *Encyclopedia of Polymer Science and Technology*, Vol. 6, page 275 (1967) and ibid., Vol. 11, page 597 (1969), published by John Wiley & Sons. Inc.

The polypropylene for use in the present invention is crystalline polypropylene and includes a homopolymer of propylene; block copolymers obtained by polymerizing propylene in a first step and then copolymerizing ethylene and an α-olefin such as propylene and butene-1 in a second step; and crystalline propylene random copolymers obtained by copolymerizing propylene and not more than 6 mole% of an α-olefin such as ethylene and butene-1.

The homopolymer of propylene and the block or random copolymers of propylene can be obtained by reacting the above-described monomer(s) in the presence of a catalyst comprising a combination of titanium trichloride and an alkylaluminum compound, which is usually called a Ziegler-Natta catalyst.

The polymerization can be practiced at a temperature of from 0° C. to 300° C. However, for the reason that in high stereospecific polymerization of an α-olefin such as propylene, polymers having high stereospecificity cannot be obtained at a temperature of 100° C. or higher, it is usually suitable to carry out the polymerization at a temperature in the range of from 0° C. to 100° C.

There is no particular restriction about the polymerization pressure, but from the industrial and economical standpoints, a pressure of from about 3 to 100 atms is preferable.

The polymerization can be carried out by either a continuous system or a batch system.

As the polymerization method for obtaining polypropylene, slurry polymerization by an inert hydrocarbon solvent such as butane, pentane, hexane, heptane, and octane, solution polymerization by polymerization in the state that the polymer formed is dissolved in the above-described inert hydrocarbon solvent, bulk polymerization of carrying out the polymerization in a liquefied monomer without using a solvent, and vapor-phase polymerization of carrying out the polymerization in a gaseous monomer can be employed.

For controlling the molecular weight of the polymer formed, a chain transfer agent such as hydrogen can be added.

The polypropylene for use in the present invention can be produced using an isospecific Ziegler-Natta catalyst. It is preferable that the catalyst to be used has a high isospecificity.

The catalyst which can be suitably used for the polymerization is titanium trichloride or a composite solid compound of a magnesium compound and a titanium compound, wherein a transition metal catalyst component thereof has a stratiform crystal structure, and a typical example of the metal component is an organoaluminum compound. The catalyst can contain a known electron donative compound as a third component.

Titanium trichloride can be obtained by reducing titanium tetrachloride with various reducing agents. As the reducing agent, metals such as aluminum, titanium, hydrogen, organometal compounds, etc. are known. A typical example of the titanium trichloride produced by the metal reduction is a titanium trichloride composition ($TiCl_3$ AA) having an activated aluminum chloride obtained by reducing titanium tetrachloride with metallic aluminum and then grinding the reduced product in an apparatus such as a ball mill and a vibration mill. For the purpose of improving the isospecificity, polymerization activity and/or graininess, a compound selected from ethers, ketones, esters, aluminum chloride, and titanium tetrachloride can be present together in the system at grinding.

More preferable titanium trichloride for the object of the present invention is titanium trichloride obtained by reducing titanium tetrachloride with an organoaluminum compound and catalytically reacting the titanium trichloride composition obtained simultaneously or successively with an ether compound and a halogen compound. As the ether compound, a compound represented by the formula $R^1$-O-$R^2$ (wherein $R^1$ and $R^2$ each represents an alkyl group having from 1 to 18 carbon atoms) is preferable, and di-n-butyl ether and di-t-amyl ether are particularly preferable. As the halogen compound, a compound selected from iodine trichloride, titanium halides (in particular, titanium tetrachloride), and halogenated hydrocarbons (in particular, carbon tetrachloride and 1,2-dichloroethane) is particularly preferable. As the organoaluminum compound, a compound represented by the formula $AlR^3{}_nX_{3-n}$ (wherein $R^3$ represents a hydrocarbon group having from 1 to 18 carbon atoms; X represents Cl, Br, or I; and n represents a number satisfying $3 \geq n > 1$) is preferable, and diethylaluminum sesquichloride is particularly preferable.

The processes of producing such titanium trichloride are described in detail in, for example, JP-A-47-34470, JP-A-53-33289, JP-A-53-51285, JP-A-54-11986, JP-A-58-142903, JP-A-60-28405, JP-A-60-22504, and JP-A-61-18606.

In the case of using titanium trichloride having a stratiform crystal structure as the transition metal compound component, as a typical metal compound component, an organoaluminum compound represented by the formula $AlR^4{}_mX_{3-m}$ (wherein $R^4$ represents a hydrocarbon group having from 1 to 18 carbon atoms; X represents Cl, Br, or I; and m is a number satisfying $3 \geq m > 0$) is preferable. A particularly preferable organoaluminum compound for the object of the present invention is a compound of the above-described formula wherein $R^4$ is ethyl or isobutyl, and m is a number satisfying $2.5 \geq m \geq 1.5$. Specific examples thereof are diethylaluminum chloride, diethylaluminum bromide, diethylaluminum iodide, and mixtures of the above-described compound and triethylaluminum or ethylaluminum dichloride. In the case of using the third component described below, an organoaluminum compound of the above-described formula wherein m satisfies $3 \geq m \geq 2.5$ or $1.5 \geq m > 0$ can be suitably used for the object of this invention.

The molar ratio of the organoaluminum compound to titanium trichloride can be selected from the wide range of from 1/1 to 1000/1.

The catalyst comprising titanium trichloride and an organoaluminum compound can contain a known third component. Examples of the third component are ester compounds such as $\epsilon$-caprolactam, methyl methacrylate, methyl benzoate, and methyl toluylate, phosphorous acid esters such as triphenyl phosphite and tributyl phosphite, and phosphoric acid derivatives such as hexamethylphosphoric triamide.

The amount of the third component used must be experimentally determined for each compound since the action of the third component varies depending on the compound being used, but the amount of the third component is generally not more than the equimolar amount to the organoaluminum compound.

In the case of using the composite solid compound of a magnesium compound and a titanium compound as the transition metal solid catalyst component of the catalyst, as a typical metal catalyst component, an organoaluminum compound, in particular, a compound represented by the formula $AlR^5{}_pX_{3-p}$ (wherein $R^5$ represents a hydrocarbon group having from 1 to 18 carbon atoms; X represents Cl, Br, or I; and p represents a number satisfying $3 \geq p > 2$) is preferable. Specific examples thereof are triethylaluminum, triisobutylaluminum, and mixtures thereof with diethylaluminum chloride or diisobutylaluminum chloride.

In the present invention, it is preferable that the catalyst contains an electron donative compound, and in particular, an aromatic monocarboxylic acid ester and/or a silicon compound containing an Si-$OR^6$ bond (wherein $R^6$ represents a hydrocarbon group having from 1 to 20 carbon atoms).

As the silicon compound containing an Si-$OR^6$ bond, an alkoxysilane compound represented by the formula $R^7{}_aSi(OR^6)_{4-a}$ (wherein $R^7$ represents a hydrocarbon group having from 1 to 20 carbon atoms, and represents a number satisfying $0 \leq a \leq 3$) is suitably used. Specific examples of the silicon compound are tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinylbutoxysilane, and diethyldiethoxysilane.

It is preferred that the electron donative compound is used in an amount of not more than 1 mole, and particular from 0.05 to 1 mole per mole of the organoaluminum compound.

Thus, in the present invention, titanium trichloride containing a chloride of magnesium obtained by reducing a composite solid compound of a magnesium compound and a titanium compound or a so-called "supported catalyst" produced by catalytically reacting a solid magnesium compound and a liquid-phase titanium compound are used. It is preferable that the solid magnesium compound contains an electron donative compound, in particular an aromatic monocarboxylic acid ester, an aromatic dicarboxylic acid diester, an ether compound, or an alcohol, and/or a phenol. The aromatic monocarboxylic acid ester may be present together at the catalytic reaction with the titanium compound.

The above-described composite solid compound of a magnesium compound and a titanium compound is described in many patent publications and the catalysts suitable for the object of this invention are described in detail in, for example, JP-A-54-112988, JP-A-54-119586, JP-A-56-30407, JP-A-57-59909, JP-A-57-59910, JP-A-57-59911, JP-A-57-59912, JP-A-57-59914, JP-A-57-59915, JP-A-57-59916, JP-A-54-112982, JP-A-55-133408, and JP-A-58-27704.

When the resin composition molded article obtained by the present invention is used for applications requiring heat resistance, rigidity, or scratch resistance, it is preferred to use, as the polypropylene, highly crystalline polypropylene wherein the homopolymer portion as a first segment of the propylene homopolymer or block copolymer polymerized in the first step has an isotactic pentad fraction of the boiling heptane-insoluble matter of at least 0.970, a content of the boiling heptane-soluble matter of not more than 5.0% by weight, and a content of the xylene-soluble matter at 20° C. of not more than 2.0% by weight.

In this case, the isotactic pentad fraction of the boiling heptane-insoluble matter, the content of the boiling heptane-soluble matter, and the content of the xylene-soluble matter at 20° C. are determined as follows.

That is, after completely dissolving 5 g of polypropylene in 500 ml of boiling xylene, the temperature of the solution is lowered to 20° C., and the resulting solution is allowed to stand for 4 hours. Thereafter, the solution is filtered to separate a xylene-insoluble matter at 20° C. The filtrate is concentrated and dried to evaporate off the xylene. Furthermore, the residue is dried under reduced pressure at 60° C. to obtain a polymer soluble in xylene at 20° C. A value of the dry weight of the polymer divided by the amount of the sample charged in terms of percentage is the content of the xylene-soluble matter at 20° C. The xylene-insoluble matter at 20° C. is dried and subjected to Soxhlet extraction with boiling n-heptane for 8 hours. The extraction residue is called as a boiling heptane-insoluble matter, and a value of the dry weight of this matter divided by the weight (5 g) of the sample in terms of percentage is the content of the boiling heptane-soluble matter.

The isotactic pentad fraction is a fraction of the isotactic chain in the pentad unit in the polypropylene molecular chain measured by the method reported by A. Zambelli, et al., *Macromolecules*, 6, 925 (1973), that is, measured using $^{13}$C-NMR, in other words, a fraction of the propylene monomer unit in the center of the chain formed by continuously mesobonded five propylene monomer units. In this case, however, the assignment of the NMR absorption peaks is made based on the report of *Macromolecules*, 8, 687 (1975) published thereafter.

Specifically, the isotacitic pentad fraction is measured as an area fraction of the mmmm peak in the total absorption peaks of the methyl carbon region of the $^{13}$C-NMR spectrum. When the isotactic pentad fraction of the standard material CRM No. M19-14 Polypropylene PP/MWD/2 available from National Physical Laboratory, England was measured by this method, it was found to be 0.944.

The highly crystalline polypropylene can be produced by the methods described in, for example, JP-A-60-28405, JP-A-60-228504, JP-A-61-218606, and JP-A-61-287917.

When the resin composition molded article by the present invention is used for applications requiring impact resistance, it is preferred to use a propylene block copolymer obtained by copolymerizing an α-olefin such as propylene and butene as a first segment polymerized in the first step as the polypropylene.

The polypropylene block copolymer can be produced by the slurry polymerization method or vapor-phase polymerization method. When the resin composition molded article by the present invention is used for applications requiring particularly high impact resistance, it is necessary to increase the amount of the second segment, and such a propylene block copolymer is suitably produced by the vapor-phase polymerization method. High-impact resistance polypropylene by the vapor-phase polymerization method can be produced by the method described in, for example, JP-A-61-287917.

In the propylene block copolymer, the propylene homopolymer portion polymerized in the first step may be a propylene homopolymer or a copolymer of propylene and ethylene or an α-olefin having from 4 to 6 carbon atoms, with the content in the polymer formed in the step being not more than 6 mole%. Also, it is preferable that the copolymer portion as a second segment polymerized in the second step is an ethylene homopolymer, or a copolymer of ethylene and propylene or of ethylene, propylene, and an α-olefin having from 4 to 6 carbon atoms, with the content of ethylene in the polymer formed in the step being at least 10 mole%. The amount of the polymer formed in the second step is from 10 to 70% by weight of the amount of the total polymers.

The amount of the second segment is suitable produced in the range of from 10 to 30% by weight in the slurry polymerization method and in the range of from 10 to 70% by weight in the vapor-phase polymerization method, respectively.

In the vapor-phase polymerization method, the block copolymer having a large content of the second segment can be produced by the method described in JP-A-1-98604, and the block copolymer is suitably used for applications requiring super high impact resistance.

The intrinsic viscosity of the second segment in a tetralin solvent at 135° C. must be changed depending on the productivity at the production thereof, the powder properties of the polymer, or the intrinsic viscosity of the first segment, but it is generally from 3 to 8 dl/g in the slurry polymerization method and from 1 to 5 dl/g in the vapor-phase polymerization method, respectively.

As the polyolefin resin for use in this invention, various kinds of modified polyolefins can be used, and specific examples are as follows.

That is, there are modified polyolefins obtained by modifying polyolefins with a compound (a) simultaneously having a carbon-carbon double bond or a carbon-carbon triple bond and at least one of a carboxylic acid group, an acid anhydride group, an acid amido group, an imido group, a carboxylic acid ester group, an epoxy group, an amino group, and a hydroxyl group in the molecule [hereinafter, the compound is referred to as "compound (a)"] in the presence or absence of a radical initiator.

Furthermore, there are modified polyolefins obtained by modifying polyolefins with the compound (a) alone or with the compound (a) and a vinyl or vinylidene compound (b) [hereinafter referred to as "compound (b)"] in the presence of a radical initiator.

Specific examples of the compound (a) are maleic anhydride, maleic acid, fumaric acid, maleimide, maleic acid hydrazide, and reaction products of maleic anhydride and a diamine, such as compounds having a structure represented by the following formula:

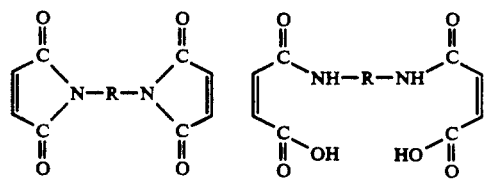

wherein R represents an aliphatic group or an aromatic group.

Also, specific examples of the compound (a) are methyl nadic anhydride; dichloromaleic anhydride; maleic acid amide; natural fats and oils such as soybean oil, tung oil, castor oil, linseed oil, hempseed oil, cotton seed oil, sesame oil, rape oil, peanut oil, tsubaki oil, olive oil, coconut oil, and sardine oil; epoxidized natural fats and oils such as epoxidized soybean oil; unsaturated carboxylic acids such as acrylic acid, butenoic acid, crotonic acid, vinylacetic acid, methacrylic acid, pentenoic acid, angelic acid, tibric acid, 2-pentenoic acid, 3-pentenoic acid, ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-diemthyl-3-butenoic acid, 2-heptenoic acid, 2-octenoic acid, 4-decenoic. acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosanedienoic acid, eicosatrienoic acid, eicosatetaenoic acid, ricinoleic acid, eleostearic acid, oleic acid, eicosapentaenoic acid, erucinic acid, docosadienoic acid, docosatrienoic acid, docosatetraenoic acid, docosapentaenoic acid, tetracosendic acid, hexacosenoic acid, hexacodienoic acid, octacosenoic acid, and tracontenoic acid; esters, acid amides, and anhydrides of these unsaturated carboxylic acids; unsaturated amines formed by substituting an —NH$_2$ group for the hydroxyl group of unsaturated alcohols such as allyl alcohol, crotyl alcohol, methylvinyl carbinol, allyl carbinol, methylpropenyl carbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, alcohols represented by the formulae $C_nH_{2n-5}OH$, $C_nH_{2n-7}OH$, and $C_nH_{2n-9}OH$, respectively (wherein n represents a positive integer), 3-buten-1,2-diol, 2,5-dimethyl-3-hexen-2,5-diol, 1,5-hexadien-3,4-diol, and 2,6-octadien-4,5-diol; and low-molecular weight polymers (e.g., those having an average molecular weight of from 500 to 10,000), such as those of butadiene and isoprene, or high-molecular weight polymers (e.g., those having an average molecular weight of higher than 10,000) having maleic anhydride or a phenol added thereto, or an amino group, a carboxyl group, a hydroxyl group, or an epoxy group introduced thereinto. Of these compounds, carboxylic acids and anhydrides thereof are preferable, with maleic acid and an anhydride thereof being most preferable.

Specific examples of the compound (b) are aromatic vinyl or vinylidene compounds such as α-methylstyrene, o-methylstyrene, m-methylstyrene, p-methylstyrene, bromostyrene, divinylbenzene, hydroxystyrene, and aminostyrene; olefins such as ethylene; (meth)acrylic acid ester compounds such as methyl (meth)acrylate, ethyl (meth)acrylate, propyl (meth)acrylate, and octyl (meth)acrylate; cyanovinyl compounds such as acrylonitrile and methacrylonitrile; ester compounds such as vinyl acetate; vinyl ether compounds such as methyl vinyl ether, ethyl vinyl ether, and butyl vinyl ether; and unsaturated halogen compounds such as vinyl chloride and vinylidene chloride. They can be used singly or as a mixture thereof.

Of these compounds, aromatic vinyl or vinylidene compounds and (meth)acrylic acid ester compounds are preferable, and styrene, divinylbenzene, methyl acrylate, and methyl methacrylate are more preferable, with styrene being most preferable.

The amount of the compound (a) used is generally from 0.01 to 30 parts by weight, and preferably from 0.05 to 20 parts by weight based on 100 parts by weight of the polyolefin.

Also, the amount of the compound (b) used is generally from 0.5 to 100 parts by weight, and preferably from 1 to 50 parts by weight based on 100 parts by weight of the polyolefin.

As a method of producing the modified polyolefin, known methods can be used. The production method of the modified polypropylene (grafted polypropylene) is specifically described below.

For grafting a graft monomer to polypropylene, various known methods can be employed.

For example, there are a method of mixing polypropylene, a graft monomer, and a radical generator and melt kneading the mixture in a melt kneading apparatus to graft the graft monomer to polypropylene, a method of dissolving polypropylene in an organic solvent such as xylene, adding a radical generator to the solution in a nitrogen atmosphere to effect the reaction by heating with stirring, and after cooling the reaction mixture, washing, filtering and drying the product to provide a grafted polypropylene, and a method of bringing polypropylene into contact with oxygen or ozone.

From the viewpoint of economy, the method of graft copolymerizing by melt kneading the above-described mixture in a melt kneading apparatus is most preferably used.

A mixture of polypropylene, an unsaturated carboxylic acid or a derivative thereof, and if desired, a radical initiator can be melt-kneaded using an extruder, a Banbury mixer, a kneader, at a temperature of from 150° to 300° C., and preferably from 190° to 280° C. for a residence time of from 0.3 to 10 minutes, and preferably from 0.5 to 5 minutes.

In an industrial practice, a method of continuously producing the grafted polypropylene using a single-screw or twin-screw extruder while removing the unreacted components (i.e., the unsaturated carboxylic acid or derivative thereof, the unreacted aromatic monomer, the radical initiator, etc.) and side reaction products thereof such as oligomers and decomposition products thereof and maintaining the bent opening portion of the extruder in a vacuum state is advantageously used. While the reaction may be carried out in air, it is preferable to carry out the reaction in an inert gas atmosphere of, e.g., nitrogen and carbon dioxide. In addition, for further removing slight amounts of the unreacted components and side reaction products contained in the grafted polypropylene obtained, the grafted polypropylene can be heat treated at a temperature of 60° C. or higher, subjected to solvent extraction, and evacuated under melting.

Also, if desired, various kinds of additives such as antioxidants, heat stabilizers, light stabilizers, nucleating agents, lubricants, inorganic or organic coloring agents, rust preventives, crosslinking agents, blowing agents, plasticizers, fluorescent agents, surface smoothening agents, and surface gloss improving agents can be added to the grafted polypropylene during the production step thereof or in the subsequent working step.

Examples of the unsaturated carboxylic acid or derivative thereof used for producing the graft propylene are unsaturated carboxylic acids such as acrylic acid, methacrylic acid, maleic acid, itaconic acid, citraconic acid, himic acid, bicyclo(2,2,2)octa-5-ene-2,3-dicarboxylic acid, 4-methylcyclohexan-4-ene-1,2-dicarboxylic acid, 1,2,3,4,5,8,9,10,-octahydronaphthalene-2,3-dicarboxylic acid, bicyclo(2,2,1)octa-7-ene-2,3,5,6-tetracarboxylic acid, and 7-oxabicyclo(2,2,1)hepta-5-ene-2,3-dicarboxylic acid; and derivatives of unsaturated carboxylic acids such as anhydrides, esters, amides, imides, and metal salts of the above-described unsaturated carboxylic acids. Also, maleic anhydride, itaconic anhydride, himic anhydride, maleic acid monoethyl ester, fumaric acid monoethyl ester, itaconic acid monomethyl ester, fumaric acid monomethyl ester, dimethylaminoethyl methacryltoluene, and divinylbenzene can be used. These compounds can be used singly or as a mixture thereof.

While the production of the grafted polypropylene can be carried out in the absence of a radical initiator, it is preferably carried out in the presence of a radical initiator. As the radical initiator, known ones can be used. Examples of the radical initiator are azo compounds such as 2,2'-azobisisobutyronirile and 2,2'-azobis(2,4,4)-trimethylvaleronitrile; and various organic peroxides such as methyl ethyl ketone peroxide, cyclohexanone peroxide, 3,3,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, lauroyl peroxide, 3,3,5-trimethylhexanoyl peroxide, benzoyl peroxide, t-butyl peracetate, t-butylperoxy isobutyrate, t-butyloxy pivalate, t-butyloxy-2-ethylhexanoate, t-butylperoxy-3,5,5-trimethylhexanoate, t-butylperoxy laurate, t-butylperoxy benzoate, di-t-butylperoxy isophthalate, 2,5-dimethyl-2,5-di(benzoylperoxy)hexane, t-butylperoxy maleate, t-butylperoxyisopropyl carbonate, and polystyrene peroxide.

In the production method of the grafted polypropylene, the melt flow rate of the starting polypropylene (e.g., a crystalline propylene homopolymer, a crystalline propyleneethylene/α-olefin block copolymer, a crystalline propylene-α-olefin random copolymer) is from 0.05 to 60 g/10 minutes, and preferably from 0.1 to 40 g/10 minutes, and it is preferred to select the starting polypropylene such that the melt flow rate of the grafted polypropylene obtained is from 0.1 to 100 g/10 minutes. Also, the number average molecular weight of the starting polypropylene is from 7,000 to 800,000, and preferably from 10,000 to 700,000.

In the production method of the grafted polypropylene, the amount of the unsaturated carboxylic acid or derivative thereof is preferably from 0.01 to 10 parts by weight, and more preferably from 0.1 to 5 parts by weight, the amount of the unsaturated aromatic monomer is preferably from 0.01 to 10 parts by weight, and more preferably from 0.1 to 5 parts by weight, and the amount of the radical initiator is preferably from 0 to 5 parts by weight, and more preferably from 0.001 to 2 parts by weight based on 100 parts by weight of polypropylene. In this case, if the amount of the unsaturated carboxylic acid or derivative thereof, or the unsaturated aromatic monomer, is less than 0.01 part by weight, the improving effect is not obtained. If the addition amount exceeds 10 parts by weight, the improving effect reaches the maximum, and no further remarkable effect is obtained. Also, it remains unreacted in the polymer to generate an odor or lower the physical properties. Further, if the amount of the radical initiator exceeds 5 parts by weight, no further remarkable effect to the graft reaction of the unsaturated carboxylic acid or derivative thereof is obtained, and the decomposition of polypropylene increases so that the change of the fluidity (melt flow rate) becomes great.

In the present invention, the grafted polypropylene or composition of grafted polypropylene and polypropylene having a melt flow rate of from 0.1 to 100 g/10 minutes, and particularly from 0.5 to 40 g/10 minutes is suitable.

Also, in the present invention, when a modified polyolefin is used, it is preferable to produce the resin composition in this invention by previously preparing the modified polyolefin and mixing it with other components, but the resin composition can be produced by simultaneously mixing the compounds (a) and/or (b) as the modifier, the polyolefin, and other necessary components.

The polyphenylene resin for use in this invention is a polyphenylene ether and/or various modified polyphenylene ethers and/or a composition containing polyphenylene ether.

The polyphenylene ether in this invention is a polymer obtained by oxidation polymerization of a phenol compound represented by the following formula (1) with oxygen or an oxygen-containing gas using an oxidative coupling catalyst.

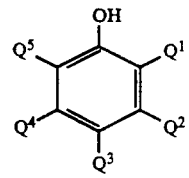

(1)

In formula (1), $Q^1$, $Q^2$, $Q^3$, $q^4$, and $Q^5$ each represents a hydrogen atom, a halogen atom, a hydrocarbon group, or a substituted hydrocarbon group, provided that one of $Q^1$, $Q^2$, $Q^3$, $Q^4$, and $Q^5$ must be a hydrogen atom.

Specific examples of $Q^1$, $Q^2$, $Q^3$, $Q^4$, and $Q^5$ in formula (1) are hydrogen, chlorine, fluorine, bromine, iodine, methyl, ethyl, propyl, butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, and ethylphenyl.

Specific examples of the phenol compound represented by formula (1) are phenol, o-cresol, m-cresol, p-cresol, 2,6-dimethylphenol, 2,5-dimethylphenol, 2,4-dimethylphenol, 3,5-dimethylphenol, 2-methyl-6-phenylphenol, 2,6-diphenylphenol, 2,6-diethylphenol, 2-methyl-6-ethylphenol, 2,3,5-trimethylphenol, 2,3,6-trimethylphenol, and 2,4,6-trimethylphenol. These phenol compounds can be used singly or as a mixture thereof.

Also, a copolymer of a dihydric phenol such as bisphenol A, tetrabromobisphenol A, resorcinol, and hydroquinone and the phenol compound represented by formula (1) can be used.

Of these compounds, a homopolymer or a copolymer of 2,6-dimethylphenol or 2,3,6-trimethylphenol is particularly preferable.

There is no particular restriction on the oxidative coupling catalyst used for oxidation polymerization of the phenol compound, and any catalysts having a polymerizing function can be used. Typical examples of the catalyst are a catalyst comprising a cuprous salt and a tertiary amine, such as cuprous chloride-triethylamine, cuprous acetate-triethylamine, and cuprous chloride-pyridine; a catalyst comprising a cupric salt, a tertiary amine, and an alkali metal hydroxide, such as cupric chloride-pyridine-potassium hydroxide; a catalyst comprising a manganese salt and a primary amine, such as manganese chloride-ethanolamine and manganese acetateethylenediamine; a catalyst comprising a manganese salt and an alcoholate or a phenolate, such as manganese chloride-sodium methylate and manganese chloride-sodium phenolate; a catalyst comprising a manganese salt, an alkali metal hydroxide, and an amine, such as manganese chloride-sodium hydroxide-diethanolamine-dibutylamine, manganese chloride-sodium hydroxidetriethanolamine-dibutylamine, and manganese chloride-sodium hydroxide-monoethanolamine-dibutylamine; and a catalyst comprising a combination of a cobalt salt and a tertiary amine.

There is no particular restriction on the intrinsic viscosity (measured in chloroform at 30° C.) of polyphenylene ether, but the intrinsic viscosity is preferably from 0.2 to 1.0 dl/g, and more preferably from 0.25 to 0.6 dl/g. Depending on the circumstance, the optimum intrinsic viscosity can be selected.

As the polyphenylene ether resin, a modified polyphenylene ether obtained by modifying polyphenylene ether with various compounds is preferably used. Preferred examples of the compound are polyfunctional compounds and organosilane compounds.

The polyfunctional compound is a compound (E) having at least one of a carboxylic acid group, an acid anhydride group, an acid amido group, an imido group, a carboxylic acid ester group, an epoxy group, an amino group, and a hydroxyl group in the molecule. A preferable polyfunctional compound is a compound (F) simultaneously having (i) a carbon-carbon double bond or a carbon-carbon triple bond and (ii) at least one of a carboxylic acid group, an acid anhydride group, an acid amido group, an imido group, a carboxylic acid ester group, an epoxy group, an amino group, and a hydroxyl group in the molecule.

Specific examples of the compound (F) are the same as those of the compound (a) used for the modified polyolefin.

Other preferred compound of the polyfunctional compound is a compound (G) selected from an aliphatic carboxylic acid, an acid ester, an acid amide represented by the following formula:

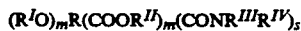

wherein R represents a straight chain or branched aliphatic saturated hydrocarbon group having from 2 to 20 carbon atoms; $R^I$ represents a hydrogen atom, an alkyl group having from 1 to 10 carbon atoms, an aryl group having up to 10 carbon atoms, an acyl group having up to 10 carbon atoms, or a carbonyldioxy group; $R^{II}$ represents a hydrogen atom, an alkyl group having from 1 to 20 carbon atoms, or an aryl group having up to 20 carbon atoms; $R^{III}$ and $R^{IV}$ each represents a hydrogen atom, an alkyl group having from 1 to 10 carbon atoms, or an aryl group having up to 10 carbon atoms; m, n, and s each is an integer of 0 or more, but $m+n+s \geq 2$, and derivatives thereof.

Specific examples of the compound (G) are oxyacetic acid, lactic acid, α-oxy-n-butyric acid, α-oxyisobutyric acid, α-oxy-n-valeric acid, α-oxyisovaleric acid, 2-oxy-2-methylbutanoic acid, α-oxy-n-caproic acid, α-oxyisocaproic acid, 2-ethyl-2-oxybutanoic acid, 2-oxy-3,3-dimethylbutanoic acid, 2-oxy-2-methylpentanoic acid, 2-oxy-5-methylhexanoic acid, 2-oxy-2,4-dimethylpentanoic acid, 3-oxypropionic acid, β-oxybutyric acid, β-oxyisobutyric acid, β-oxy-n-valeric acid, β-oxyisovaleric acid, 2-oxymethylbutanoic acid, oxypivalic acid, 3-oxy-2-methylpentanoic acid, 11-oxytetradecanoic acid, jalapinolic acid, 14-oxyhexadecanoic acid, sabinic acid, juniperic acid, oxymalonic acid, methyltartronic acid, ethyltartronic acid, n-propyltartronic acid, isopropyltartronic acid, oxymethylmalonic acid, oxyisopropylmalonic acid, ethyloxynethylmalonic acid, malic acid, α-methylmalic acid, α-oxy-α'-methylsuccinic acid, α-oxy-α',α'-dimethylsuccinic acid, α-oxy-α'-ethylsuccinic acid, α-oxy-α'-methyl-α-ethylsuccinic acid, trimethylmalic acid, α-oxyglutaric acid, β-oxyglutaric acid, β-oxy-β-methylglutaric acid, α-oxyadipic acid, citric acid, isocitric acid, norcaperatic acid, agaritic acid, glyceric acid, α,β-dioxybutyric acid, α,β-dioxyisobutyric acid, β,β'-dioxyisobutyric acid, βγ-dioxybutyric acid, α,γ-dioxy-β,β-dimethylbutyric acid, α,β-dioxy-α-isopropylbutyric acid, isopropyl acid, ustic acid-A, 9,10-dioxyoctadecanoic acid, tartaric acid (optical active isomer or racemate), mesotartaric acid, methyltartaric acid, α,β-dioxyglutaric acid, α,γ-dioxyglutaric acid, α,γ-dioxy-β-methylglutaric acid, α,γ-dioxy-β-methyl-β-ethylglutaric acid, α,γ-dioxy-α,γ-dimethylglutaric acid, α,δ-dioxyadipio acid, β,γ-dioxyadipic acid, 6,7-dioxydodecane diacid, 7,8-dioxyhexadecane diacid, furoic acid, trioxybutyric acid, trioxyisobutyric acid, trioxyglutaric acid, succinic acid, glutaric acid, adipic acid, α-methylglutaric acid, and dodecane diacid.

Also, examples of the derivative of the compound represented by the above-described formula are lactones, acid anhydrides, alkali metal salts, alkaline earth metal salts, and salts with amines. Specific examples are β-propiolactone, glucolide, lactide, β-methylpropiolactone, β,β-dimethylpropiolactone, β-n-propylpropiolactone, β-isopropylpropiolactone, β-methyl-β-ethylpropiolactone, γ-butyrolactone, γ-valerolactone, δ-valerolactone, δ-caprolactone, ε-valerolactone, 15-oxypentadecanoic acid lactone, γ-butyrolactone-α-carboxylic acid, paraconic acid, α-methylparaconic acid, β-methylparaconic acid, α-ehylparaconic acid, α-isopropylparaconic acid, γ-methylparaconic acid, γ-ethylparaconic acid, α,γ-dimethylparaconic acid, β,γ-dimethylparaconic acid, α,α, β-trimethylparaconic acid, γ,γ-dimethylparaconic acid, nephrosteraic acid, γ-valerolactone-γ-carboxylic acid, γ-isopropyl-γ-valerolactone-γ-carboxylic acid, α,α-dimethyl-γ-butyrolactone-γ-carboxylic acid, β-methyl-γ-valerolactone-γ-carboxylicacid,α,β-dimethyl-γ-valerolactone-γ-carboxylic acid, α,β-dimethyl-γ-butyrolactone-γ-carboxylic acid, homoisocarpic acid, α-(γ-oxycarbonylpropyl)-γ-buyrolactone, β-oxyadipic acid-γ-lactone, α,δ-dimethyl-β-oxyadipic acid-γ-lactone, β-oxy-β-methyladipic acid-γ-lactone, α-(δ'-carboxy-n-butyl)-γ-butyrolactone, α-methylisocitric acid lactone, cinchonic acid, α-oxy-γ-valerolactone, β-oxy-γ-butyrolactone, δ-oxy-γ-valerolactone, pantolactone, mevalonic acid, malic anhydride, tartaric anhydride, oxyglutaric anhydride, α,β,γ-trioxyvaleric acid lactone,α-oxy-α-oxymethyl-γ-butyrolactone,succinicanhydride, and glutaric anhydride. These compounds can be used singly or as a mixture thereof.

Of these compounds, tartaric acid, malic acid, citric acid, and derivatives thereof are particularly preferable.

The above-described compounds include various kinds of commercially available states of these acids (e.g., acids in the anhydride state or hydrate).

Specific examples of the useful derivatives are acetyl citrate, monostearyl citrate, distearyl citrate, N,N'-diethylcitric acid amide, N,N'-dipropylcitric acid amide, N-phenylcitric acid amide, N-dodecylcitric acid amide, N,N'-didodecylcitric acid amide, N-dodecylcitric acid amide, calcium malate, calcium citrate, potassium malate, and potassium citrate.

As other preferred polyfunctional compound, there is a compound (H) having (i) an acid halide group, and most preferably an acid chloride group and (ii) at least one of a carboxylic acid group, a carboxylic acid anhydride group, an acid ester group, and an acid amido group, and preferably a carboxylic acid group or a carboxylic acid anhydride group in the molecule.

Specific examples of the compound (H) are anhydrotrimellitic acid chloride, chloroformylsuccinic acid anhydride, chloroformylsuccinic acid, chloroformylglutaric acid anhydride, chloroformylglutaric acid, chloroacetylsuccinic acid anhydride, chloroacetylsuccinic acid, trimellitic acid chloride, and chloroacetylglutaric acid. Of these compounds, anhydrotrimellitic acid chloride is suitable.

These compounds (F), (G), and (H) are described in detail in U.S. Pat. Nos. 4,315,086 and 4,642,358.

As still other preferred polyfunctional compound in this invention, there is a condensed high-molecular weight compound (J) of a compound having an oxysilane group in the molecular and/or a dihydric phenol and epichlorohydrin.

Specific examples of the compound (J) are epoxidized materials of olefins or cyclalkanes, such as ethylene oxide, propylene oxide, and cyclohexene oxide.

Also, typical examples of compounds obtained by condensing a dihydric phenol and epichlorohydrin at various ratios are condensation products of bisphenol A and epichlorohydrin (e.g., Sumiepoxy ELA-115, ELA-127, ELA-128, ELA-134, ESA-011, ESA-014, ESA-017, ESA-019, made by Sumitomo Chemical Company, Limited), condensation products of resorcinol and epichlorohydrin, condensation products of hydroquinone and epichlorohydrin, condensation products of tetrabromobisphenol A and epichlorohydrin, and products obtained by glycidyl etherifying phenol novolak or cresol novolak (e.g., Sumiepoxy ESCN-220 series, made by Sumitomo Chemical Company, Limited).

Further, condensation products of polyhydric alcohols and epichlorohydrin can be used. Examples of the polyhydric alcohol are ethylene glycol, propylene glycol, butylene glycol, polyethylene glycol, polypropylene glycol, glycerol, trimethylolethane, trimethylolpropane, and pentaerythritol.

Moreover, glycidyl ether compounds of monohydric phenols or monohydric alcohols, such as phenyl glycidyl ether, butyl glycidyl ether, and cresyl glycidyl ether, can be used.

Also, glycidylated compounds of amine compounds (e.g., Sumuepoxy ELN-125 which is a diglycidylated compound of aniline, made by Sumitomo Chemical Company, Limited.) can be used.

Also, high-molecular weight compounds of an epoxy-containing unsaturated compound (e.g., glycidyl acrylate, glycidyl methacrylate, allyl glycidyl ether) or copolymers of an epoxy-containing unsaturated compound and at least one of other monomer (e.g., ethylene, propylene, 1-butene, styrene, α-methylstyrene, 4-methyl-1-pentene, chlorostyrene, fluorostyrene, bromostyrene, acrylic acid, acrylic acid esters, vinyl chloride, methacrylic acid, methacrylic acid esters, maleic anhydride, vinyl acetate) can be used. Of these high-molecular weight compounds, a styrene-glycidyl (meth)acrylate copolymer and an ethyene-glycidyl (meth)acrylate copolymer are particularly preferably used.

The organosilane compound used in the present invention is a compound (K) simultaneously having (i) at least one silicon atom bonded to a carbon atom through an oxygen atom, (ii) a carbon-carbon double bond or a carbon-carbon triple bond, and (iii) at least one functional group selected from an amino group, a mercapto group, a carboxylic acid group, an acid anhydride group, an acid amido group, a carboxylic acid ester group, an imido group, and an a hydroxyl group.

In such a compound (K), the C-O-Si component is usually present as an alkoxy group or an acetoxy group directly bonded to a silicon atom. Such an alkoxy group or an acetoxy group generally has less than 15 carbon atoms and may have a different atom (e.g., oxygen). Furthermore, the above-described compound may have two or more silicon atoms. When the compound has a plural number of silicon atoms, the silicon atoms are bonded through an oxygen bond (e.g., the case of siloxane), a silicon-silicon bond, or a difunctional organic group (e.g., a methylene group, a phenylene group).

Suitable examples of the compound (K) are γ-aminopropyltriethoxysilane, 2-(3-cyclohexenyl)ethyltrimethoxysilane, 1,3-divinyltetraoxysilane, vinyltris(2-methoxyethoxy)silane, 5-bicycloheptenyltriethoxysilane, and γ-mercaptopropyltrimethoxysilane.

In the present invention, the amount of each of the compounds (E) to (K) can be selected depending on the purposes but is generally not more than 200 parts by weight, preferably not more than 20 parts by weight, and more preferably from 0.01 to 10 parts by weight based on 100 parts by weight of polyphenylene ether.

In the case of modifying polyphenylene ether with the compounds (E), (F), (G), (H), (J), or (K), a radical generator can be used, if desired. As the radical generator, known organic peroxides and diazo compounds can be used. Preferred examples thereof are benzoyl peroxide, dicumyl peroxide, ditert-butyl peroxide, tert-butylcumyl peroxide, tert-butyl hydroperoxide, cumene hydroperoxide, and azobisisobutyronitrile. The amount of the radical generator is from 0.01 to 10 parts by weight, and preferably from 0.1 to 5 parts by weight based on 100 parts of polyethylene ether.

The modified polyphenylene ether in the present invention may be one formed by chemical reaction of polyphenylene ether and the above-described compound, or may be one formed by physical interaction (e.g., physical adsorption to polyphenylene ether) of polyphenylene ether and the compound.

Furthermore, as the preferred modified polyphenylene ether in the present invention, a compound obtained by graft-polymerizing the polyfunctional compound (F) having an unsaturated group and other unsaturated monomer to polyphenylene ether in the presence of a radical initiator can be used.

As such an unsaturated monomer, a vinyl and/or vinylidene compound (L) is preferably used. As the compound (L), the same compounds as those for the compound (b) used for the modified polyolefin described above can be used.

These unsaturated monomers may be used singly or as a mixture thereof. Preferred examples of the unsaturated monomer used for the graft polymerization are styrene, styrene/glycidyl methacrylate, styrene/glycidyl acrylate, styrene/maleic anhydride, styrene/acrylic acid, and styrene/methacrylic acid.

In the present invention, the amount of the compound (L) is not more than 200 parts by weight, preferably from 0.5 to 100 parts by weight, and more preferably from 1 to 50 parts by weight based on 100 parts by weight of polyphenylene ether.

There is no particular restriction on the production method of the modified polyphenylene ether in the present invention, and known methods can be used.

For example, the methods enumerated below can be used.

(1) A method of uniformly mixing polyphenylene ether and the above-described compounds as a pellet state, a powder state, or a fine piece sate using a high-speed stirrer, etc. and melt kneading the mixture.

(2) A method of adding the above-described compounds to a solution of polyphenylene ether dissolved or swollen in a solvent and heating the mixture with stirring.

(3) A method of adding the above-described compounds to polyphenylene ether, dispersing the mixture in water, and then heating the dispersion with stirring.

In the method (1), there are no particular restrictions on the temperature and time for melt kneading. The temperature varies slightly depending on the kinds and amounts of the compounds but is generally in the range of from 150° to 350° C. As a method for melt kneading, any method capable of treating a molten viscous material can be used and a batch system or a continuous system can be used. Specific examples of the apparatus used for melt kneading are a single- or multi-screw extruder, a Banbury mixer, a roll, and a kneader.

There is no particular restriction on the solvent used in the method (2), and any solvents which can dissolve or swell polyphenylene ether therein can be used.

In the case of the method (3), it is preferable to use a dispersion stabilizer such as polyvinyl alcohol, sodium dodecylbenzenesulfonate, and calcium phosphate. Also, if desired, a solvent for dissolving or swelling polyphenylene ether therein is added to the dispersion.

Specific examples of the solvent are chloroform, methylene chloride, benzene,.xylene, chlorobenzene, cyclohexane, styrene, toluene, and o-chlorophenol. Also, a mixed solvent which can dissolve or swell polyphenylene ether therein may be used. There is no particular restrictions on the temperature and time for blending the compounds, but the temperature is generally from 20° to 250° C., and the time is generally from one minute to 10 hours.

The unsaturated polyester resin used in the present invention comprises a dicarboxylic acid component, at least 40 mole% of which is terephthalic acid, and a diol component. As other dicarboxylic acid component than terephthalic acid in the above-described dicarboxylic acid component, an aliphatic dicarboxylic acid having from 2 to 20 carbon atoms, such as adipic acid, sebacic acid, and dodecanedicarboxylic acid; an aromatic dicarboxylic acid such as isophthalic acid and naphthalenedicarboxylic acid; and alicyclic dicarboxylic acids such as cyclohexanedicarboxylic acid can be used. These compounds can be used singly or as a mixture thereof. As the above-described diol component, aliphatic glycols and alicyclic glycols, such as ethylene glycol, 1,3-propanediol, 1,4-butanediol, 1,6-hexanediol, 1,10-decanediol, and 1,4-cyclohexanediol, can be used. These compounds can be used singly or as a mixture thereof.

Of these saturated polyester resins, polybutylene terephthalate or polyethylene terephthalate gives rise to a more desired effect of the present invention. Also, it is preferable that when the saturated polyester resin is dissolved in o-chlorophenol, the intrinsic viscosity thereof measured at 25° C. is in the range of 0.5 to 3.0 dl/g. When a saturated polyester resin having an intrinsic viscosity outside the aforesaid range is used, a desired mechanical strength is reluctant to obtain.

[III] Modifier (D)

As the modifier (D), practical examples of the carboxylic acid having at least 2 carboxyl groups in the molecule or derivative thereof are succinic acid, glutaric acid, adipic acid, pimelic acid, suberic acid, azelaic acid, nonamethylcarboxylic acid, undecamethylenedicarboxylic acid, dl-methylsuccinic acid, methylmalonic acid, ethylmalonic acid, dimethylmalonic acid, dl-methylsuccinic acid, tetramethylsuccinic acid, vinaconic acid, d-camphoric acid, acetylmalic anhydride, isovaleric anhydride, isobutyric anhydride, succinic anhydride, heptanoic acid, methylsuccinic anhydride, butyric anhydride, d-tartaric acid, 1-tartaric acid, d-saccharic acid, mucic acid, 1-malic acid, dioxytartaric acid, dl-citramalic acid, dl-bromosuccinic acid, calcium 1-malate, dl-1,2-dibromosuccinic acid, 1,4-pyrrone-2,6-dicarboxylic acid, diethyl 1-malate, DL-aspartic acid, dl-isocamphoric acid, diglycollic acid, 1,1-cyclopropanedicarboxylic acid, dl-citramalic acid, and oxalic acid.

Examples of the amine having at least 2 nitrogen atoms in the molecule are hexamethylenediamine, hexamethylenetetramine, polyalkylenepolyamines, phenylenediamine, 4,4'-diaminodiphenyl compounds, m-xylenediamine, and toluidine derivatives of aniline, N-alkylanilines, and N-phenylanilines.

As urea or the derivative thereof, urea is $CO(NH_2)_2$, and examples of the derivative thereof are methylurea, sym-diethylurea, ethylurea, sym-dimethyluera, unsym-diethylurea, acetylurea, acetylmethylurea, sym-ethylphenylurea, phenylurea, symdiphenylurea, benzylurea, tetraphenylurea, benzoylurea, p-ethoxyphenylurea, ethyleneurea, allylthiourea, sym-dimethylthiourea, sym-diethylthiourea, sym-diphenylthiourea, phenylthiourea, benzylthiourea, s-benzylisothiourea, and benzoylthiourea.

[IV] Rubber Material and Modified Rubber Material

Then, the rubber material and the modified rubber material used in the present invention are described in detail.

As the rubber material which is used for the purpose of improving the impact resistance, in particular, the low-temperature impact resistance in the present invention, ethylenic copolymer rubbers, propylene-1-butene rubber, isoprene-butylene rubber, polyisoprene, polybutadiene, styrene block copolymers (e.g., styrene-butadiene rubber, a styrene-butadiene-styrene block copolymer, a partially hydrogenated styrene-butadiene block copolymer, and styrene-isoprene block copolymer), linear low-density polyethylene, and mixtures thereof can be used.

Examples of the ethylenic copolymer rubber are ethylene-α-olefin copolymer rubbers and ethylene-α- olefin-nonconjugated diene copolymer rubbers, such as ethylene-propylene copolymer rubber (hereinafter referred to as "EPM") and ethylene-propylene-non-conjugatedcopolymerrubber(hereinafter referred to as "EPDM"), an ethylene-vinyl acetate copolymer, an ethylene-methyl (meth)acrylate copolymer, an ethylene-ethyl (meth)acrylate copolymer, an ethylene-butyl (meth)acrylate copolymer, an ethylene-(meth)acrylic acid copolymer (or a copolymer of a partial metal salt thereof), an ethylene-(meth)acrylic acid-(meth)acrylic acid ester copolymer, an ethylene-vinyl alcohol copolymer, an ethylene-vinyl acetate-vinyl alcohol copolymer, and an ethylene-styrene copolymer. These ethylenic copolymer rubbers can be used singly or as a mixture thereof. Also, the ethylenic copolymer rubber can be used as a mixture with low-density polyethylene or high-density polyethylene having good compatibility with the ethylenic copolymer rubber.

The modified rubber material is obtained by a method of graft-polymerizing the compound (a) used for forming the modified polyolefin as a modifying monomer described above or the compound (a) and the compound (b) described above to the above-described rubber material, if desired, in the presence of a radical initiator, or a method of directly copolymerizing an unsaturated carboxylic acid or a derivative thereof in the main chain of an α-olefin in the presence of a polymerization initiator and a catalyst.

As the rubber material or the rubber material used as a starting material for the modified rubber material, the ethylenic copolymer rubbers and styrene block copolymers are suitably used.

Of the ethylenic copolymer rubbers, ethylene-α-olefin copolymer rubbers and ethylene-α-olefin-non-conjugated copolymer rubbers are particularly preferable. Examples of the ethylene-α-olefin copolymer rubbers include a copolymer rubber of ethylene and other α-olefin such as propylene, 1-butene, 1-pentene, 1-hexene, 4-methyl-1-pentene, and 1-octene, and a terpolymer rubber such as an ethylene-propylene-1-butene terpolymer. Of these rubbers, ethylene-propylene copolymer rubber and ethylene-1-butene copolymer rubber are preferably used. Also, an ethylene-α-olefin-non-conjugated copolymer rubber can be used. In this case, it is preferred that the content of the non-conjugated diene in the starting material rubber is not more than 3% by weight. If the content of the non-conjugated diene exceeds 3% by weight, gelation undesirably occurs at kneading.

The content of ethylene in the ethylene-α-olefin copolymer rubber is from 15 to 85% by weight, and preferably from 40 to 80% by weight. That is, a highly crystalline copolymer having an ethylene content of more than 85% by weight is reluctant to work under an ordinary molding condition, and also a copolymer having an ethylene content of less than 15% by weight has an increased glass transition temperature (Tg) to lose the rubber properties.

The ethylene-α-olefin copolymer rubber preferably has such a number average molecular weight that it can be kneaded in an extruder, e.g., in the range of from 10,000 to 100,000. If the molecular weight is too small, handling of the rubber at supplying to an extruder is difficult, while if the molecular weight is too large, the fluidity of the rubber is reduced to make the working difficult.

There is also no particular restriction on the molecular weight distribution of the ethylene-α-olefin copolymer rubber and ordinarily produced or commercially available copolymer rubbers having a varied molecular weight distribution, such as mono-modal type copolymer rubber and bi-modal type copolymer rubber, can be used.

The Q value (weight average molecular weight/number average molecular weight) of the molecular weight distribution is preferably in the range of from 1 to 30, and more preferably from 2 to 20.

The copolymer rubber is a copolymer rubber produced using a so-called Ziegler-Natta catalyst, and as the catalyst, a combination of an organoaluminum compound and a trivalent to pentavalent vanadium compound soluble in a hydrocarbon solvent is used. Examples of the aluminum compound are alkylaluminum sesquichlorides, trialkylaluminums, dialkyaluminum monochlorides, and mixtures thereof. Also, examples of the vanadium compound are vanadium oxychloride, vanadium tetrachloride, and vanadate compounds represented by the formula $VO(OR^8)_q X_{3-q}$ (wherein $0 < q \leq 3$, and $R^8$ represents a straight chain, branched, or cyclic hydrocarbon having from 1 to 10 carbon atoms).

Of the above-described styrene block copolymers, a partially hydrogenated styrene-butadiene block copolymer is particularly preferable. The partially hydrogenated styrenebutadiene block copolymer is produced by a partial hydrogenation treatment of a styrene-butadiene block copolymer, and the structure and production method thereof are described below.

In the partially hydrogenated styrene-butadiene block copolymer, the number average molecular weight of the block copolymer rubber is from 10,000, to 1,000,000, and preferably from 20,000 to 300,000, the number average molecular weight of the unsaturated aromatic polymer block A in the block copolymer rubber is 1,000 to 200,000, and preferably from 2,000 to 100,000, the number average molecular weight of the conjugated diene polymer block B is from 1,000 to 200,000, and preferably from 2,000 to 100,000, and the weight ratio of the unsaturated aromatic polymer block A to the conjugated diene polymer block B is from 2/98 to 60/40, and from 10/90 to 40/60.

As the production method of the block copolymer rubber, many methods are proposed. Typically, a block copolymer rubber of an unsaturated aromatic hydrocarbon and a diene hydrocarbon can be obtained by block polymerization in an inert solvent using a lithium catalyst or a Ziegler catalyst by the method described in JP-B-40-23798 (the term "JP-B" as used herein means an "examined published Japanese patent application").

The hydrogenation treatment of the block copolymer rubber is carried out in an inert solvent in the presence of a hydrogenation catalyst by the methods described in, e.g., JP-B-42-8704, JP-B-43-6636, and JP-B-46-20814. The hydrogenation ratio is at least 50%, and preferably at least 80% of the polymer block B, and 25% or less of the aromatic unsaturate bond of the polymer block A is subjected to nuclear hydrogenation. A typical product of the partially or completely hydrogenated block copolymer is commercially available as a trade name, Kraton-G from Shell Chemical Co., U.S.A.

In the production method of the modified rubber material, various known methods can be employed for graft copolymerization of a graft monomer to a starting rubber material.

For example, a method of mixing a starting rubber material, a graft monomer, and a radical initiator and melt kneading the mixture in a melt kneading apparatus to effect grafting; a method of dissolving an ethylenic copolymer rubber in an organic solvent such as xylene, adding a radical initiator to the solution in a nitrogen atmosphere, reacting the mixture with stirring upon heating, and after cooling the reaction mixture, washing, filtering, and drying the reaction mixture to obtain a grafted copolymer rubber; a method of irradiating an ethylenic copolymer rubber with a ultraviolet light in the presence of a graft monomer; and a method of bringing an ethylenic copolymer rubber into contact with oxygen or ozone can be employed.

From the viewpoint of economy, the method of melt kneading the above-described mixture in a melt kneading apparatus to effect graft copolymerization is most preferably employed.

In the present invention, the modified rubber material can be obtained by melt kneading the rubber material as a starting material and the compound (a) which is the same as the modifying monomer used for modifying the polyolefin, or the compound (a) and the compound (b) in the optional presence of a radical initiator using an extruder, a Banbury mixer, a kneader, etc. at a temperature of from 200° to 280° C., and preferably from 230° to 260° C. for a residence time of from 0.2 to 10 minutes, which varies depending on the kind of the radical initiator.

As the compound (a), an unsaturated carboxylic acid or a derivative thereof is preferable, and as the compound (b), an unsaturated aromatic monomer is preferable. As the unsaturated carboxylic acid or derivative thereof, maleic anhydride is most preferable. As the unsaturated aromatic monomer, styrene is most preferable, but o-methylstyrene, p-methylstyrene, α-methylstyrene, vinyltoluene, and divinylbenzene can also be used. These compounds can be used as a mixture thereof.

In kneading, if oxygen is excessively present, a gel-like material is sometimes formed, or the product is sometimes remarkably colored. Therefore, it is desirable to knead the mixture in the substantial absence of oxygen.

Also, if the kneading temperature is lower than 200° C., a desired addition amount of the compound (a) is not obtained, and the effect of improving the graft reaction amount is small. Also, if the kneading temperature exceeds 280° C., the effect for improving the graft reaction amount is small, and the formation of a gel-like material or the coloration sometimes undesirably occurs.

There is no particular restriction on the kneading machine for the modification, but from the standpoint that continuous production can be achieved, the use of an extruder machine is generally preferable. It is desirable that the extruder has a single screw or twin screws suitable for uniformly mixing the various starting material supplied.

For removing the unreacted components [e.g., the compounds (a) and (b)] and the side reaction products such as oligomers of these compounds and decomposition products thereof from the reaction product, they can be sucked out by a vacuum pump from a bent line at an intermediate portion or near the outlet of the extruder, or a method of dissolving the reaction product in a suitable solvent, followed by crystallization to effect purification can be used. Also, the reaction product can be heat treated at a temperature of 60° C. or higher or evacuated in a molten state.

In the case of supplying the above-described three of four components to an extruder, each of the components can be supplied separately or after previously uniformly mixing part or whole of the components uniformly, the mixture can be supplied. For example, a method of previously impregnating the rubber with the compound (b) together with the radical initiator and simultaneously feeding the impregnated rubber and the compound (a) at kneading can be employed. Also, a method of modifying the rubber by supplying the radical initiator and/or the compound (b) from an intermediate portion of the extruder can be used.

Furthermore, if desired, the modified rubber material can be with added various additives such as heat stabilizers, light stabilizers, nucleating agents, lubricants, antistatic agents, inorganic or organic coloring agents, rust preventives, crosslinking agents, blowing agents, plasticizers, fluorescent agents, surface smoothening agents, and surface gloss improving agents, during the production step or in the subsequent working step.

In the production of the above-described modified rubber material, the unsaturated aromatic monomer is used for the purposes of preventing the formation of gels and improving the graft reaction amount. The amount of the unsaturated aromatic monomer is preferably from 0.2 to 20 parts by weight, and the amount of the unsaturated carboxylic acid or derivative thereof is preferably from 0.5 to 15 parts by weight based on 100 parts by weight of the starting rubber material. In the case of using the aromatic monomer, the amount of the unsaturated carboxylic acid or derivative thereof is preferably from 0.5 to 15 parts by weight, and the weight ratio of the unsaturated aromatic monomer to the unsaturated carboxylic acid or derivative thereof is preferably from 0.1 to 3.0, and more preferably from 0.5 to 2.0.

If the weight ratio of the unsaturated aromatic monomer to the unsaturated carboxylic acid or derivative thereof is less than 0.1, the effect of preventing the formation of gels and improving the graft reaction amount is not obtained, and if it exceeds 3.0, no further effect is expected.

The amount of the radical initiator varies depending on the kind of the radical initiator or the kneading condition but is usually from 0.005 to 1.0 part by weight, and preferably from 0.01 to 0.5 part by weight based on 100 parts of the starting rubber. If the amount of the radical initiator is less than 0.005 part by weight, a desired addition amount of the unsaturated carboxylic acid or derivative thereof is not obtained, and the effect of increasing the addition amount of the unsaturated carboxylic acid or derivative thereof by the use of the unsaturated aromatic monomer in combination is reduced. Also, if the amount of the radical initiator exceeds 1.0 part by weight, the formation of a gel-like material undesirably occurs.

It is preferred that in the modified rubber material thus obtained, the addition amount of the unsaturated carboxylic acid or derivative thereof is from 0.1 to 5% by weight, the addition amount of the unsaturated aromatic monomer is from 0.1 to 5% by weight, and the Mooney viscosity ($ML_{1+4}$, 121° C.) is from 5 to 120.

As other method used for the production of the modified rubber material, a method of copolymerization in the main chain in the presence of a polymerization initiator and a catalyst can be employed. In general, the modified rubber material can be produced by a known high-pressure radical polymerization method described below. A copolymerization reaction of ethylene and a monomer (comonomer) radical copolymerizable with ethylene using a free radical generator such an organic peroxide and oxygen is usually carried out at a polymerization temperature of from 130° to 300° C. and a polymerization pressure of from 500 to 3,000 kg/cm$^2$.

Examples of the radical copolymerizable monomer are unsaturated carboxylic acids such as acrylic acid and methacrylic acid; esterification products thereof; and vinyl esters such as vinyl acetate. Specific examples of the esterification product of an unsaturated carboxylic acid are methyl acrylate, ethyl acrylate, methyl methacrylate, glycidyl acrylate, and glycidyl methacrylate. These comonomers can be used singly or as a mixture thereof.

The content of the comonomer contained in the modified rubber material obtained by the direct copolymerization is in the range of from 0.1 to 40% by weight, and preferably from 1 to 35% by weight. If the content of the comonomer is less than 0.1% by weight, no improving effect is obtained.

Of these copolymers, those enumerated as the ethylenic copolymer rubber of the rubber material or the rubber material as the starting material of the modified rubber material are excluded.

Of these materials, an ethylene-acrylic acid copolymer, an ethylene-methacrylic acid copolymer, an ethylene-glycidyl acrylate copolymer, and ah ethylene-glycidyl methacrylate copolymer are preferable.

An amorphous terpolymer obtained by copolymerizing a copolymer with an unsaturated carboxylic acid ester or a vinyl ester is more preferable.

The modified thermoplastic resin (B) and the modified rubber material can be produced by co-grafting. As an specific example thereof, the production of grafted polypropylene is illustrated below.

Grafted polypropylene can be produced by co-grafting (co-modifying) the starting polypropylene and starting modified rubber material while simultaneously adding an unsaturated carboxylic acid or a derivative thereof, or an unsaturated carboxylic acid or a derivative thereof and an unsaturated monomer.

That is, by the same production method as in the production of the grafted polypropylene or modified rubber material, co-grafting is carried out by co-existing the starting material polypropylene and rubber material and graft copolymerizing them with an unsaturated carboxylic acid or a derivative thereof, or an unsaturated carboxylic acid or a derivative thereof and an unsaturated aromatic monomer in the optional presence of a radical initiator. Preferred examples of the starting material rubber material which is used for the co-grafting are ethylenic copolymer rubbers and partially hydrogenated styrene-butadiene block copolymers.

As the method for co-existing the starting polypropylene and rubber material, various known methods can be used. That is, in the case that the both starting materials are pellets or ground products, a method of feeding the respective starting materials to a co-grafting apparatus such as an extruder separately or from the same feeding inlet, to co-exist the both starting materials in the apparatus and a method of uniformly pre-mixing the starting materials using a simple mixer such as a tumbler and a Henshel mixer can be employed. In the case that either one of the starting materials is a large solid material such as a veil-like material, a method of previously uniformly melt kneading the starting materials using a batch-type melt kneading apparatus such as a role, a kneader, and a Banbury mixer and further forming pellets or ground products of the starting materials such that they can be easily supplied into a co-grafting apparatus can be used.

The step other than the step of co-existing the starting polypropylene and rubber material can be carried out in the same manner as in the graft polymerization step used for producing grafted polypropylene or the modification step used for producing the modified rubber material, to thereby effect co-grafting.

In the co-grafting, the blending ratio of the starting polypropylene and rubber material can be properly selected but is preferably determined by estimating the proportions of the grafted polypropylene and modified rubber material in the polyamide resin composition of the present invention.

In the co-grafting, the amount of the unsaturated carboxylic acid or derivative thereof is preferably from 0.01 to 20 parts by weight, and more preferably from 0.1 to 5 parts by weight based on the total amount of the starting polypropylene and rubber material. In the case that the unsaturated aromatic monomer is used, the amount of the unsaturated aromatic monomer is preferably from 0.01 to 15 parts by weight, and more preferably from 0.1 to 5 parts by weight, and the weight ratio of the unsaturated aromatic monomer to the unsaturated carboxylic acid or derivative thereof is preferably from 0.1 to 3.0, and more preferably from 0.5 to 2.0. In this case, if desired, a radical initiator can be used in an amount of from preferably 0 to 5 parts by weight, and more preferably from 0.001 to 2 parts by weight.

In order to disperse the starting polypropylene and ethylenic copolymer rubber while dynamically co-grafting the both starting materials, it is preferred to use a high-mix-kneading melt kneading apparatus such as a high mix-kneading di-axial extruder.

[V] Other Additives

In the present invention, for the purpose of reinforcement of the polyamide resin composition, imparation of functions, extension (cost-down), etc., a filler can be used.

Examples of the filler include glass fibers, carbon fibers, polyamide fibers, metal fibers such as aluminum fibers and stainless steel fibers, fibers such as metal whiskers, and inorganic fillers such as silica, alumina, calcium carbonate, talc, mica, clay, kaolin, carbon black, $TiO_2$, $ZnO$, and $Sb_2O_3$.

All of these fillers can be used for reinforcement. Fillers such as carbon fibers, metal fibers, and carbon black can be used for lowering the surface specific resistance and volume specific resistance, to impart an electric conductivity to the resin composition molded article of the present invention. Also, if cost of the filler is lower than the resin, it can be used as an extender to achieve the cost-down.

For the purpose of improving the rigidity and heat resistance of the polyamide resin composition molded article of the present invention, it is preferable to use an inorganic filler such as glass fibers, potassium titanate whiskers, talc, mica, and calcium carbonate, or carbon fibers.

Furthermore, the polyamide resin composition molded article of this invention can be used as a composite material having a flame retarder or flame retarder assistant, a lubricant, a nucleating agent, a plasticizer, a dye, a pigment, an antistatic agent, an antioxidant, a weatherproof imparting agent, etc. added thereto.

[VI] Composition Ratio

The polyamide resin composition in this invention comprises 100 parts by weight of the resin composition (C) comprising the polyamide resin (A) and other thermoplastic resin (B) and from 0 to 20 parts by weight of the modifier (D).

In 100 parts by weight of the resin composition (C) is contained the polyamide resin (A) in an amount of from 10 to 80% by weight, and preferably from 30 to 70% by weight. If the content of the polyamide resin is less than 10% by weight, the improvements in coating properties, rigidity, and heat resistance are insufficient. Also, if the content exceeds 80% by weight, while the coating properties, adhesion, and printability are good, there are problems on the water absorption and cost.

The thermoplastic resin (B) other than the polyamide resin in the resin composition (C), such as at least one resin selected from polyolefin resins, polyphenylene resins, and saturated polyester resins, is contained in an amount of from 90 to 20% by weight, and preferably from 70 to 30% by weight. If the content of the thermoplastic resin (B) other than the polyamide resin is less than 10% by weight, while the coating properties, adhesion, printability, etc. are good, and it is not necessary to blendcompound the modifier (D), the hygroscopicity is undesirably increased. On the other hand, if the content of the thermoplastic resin (B) exceeds 80% by weight, the improvements in coating properties and physical properties are insufficient even by blending with the modifier (D).

Also, if the content of the modifier (D) exceeds 20 parts by weight based on 100 parts of the resin composition (C) containing the polyamide resin, the preferred properties in toughness, etc. are not obtained.

Also, in the case of the resin composition (C) having the rubber material, fillers, etc. as described below, blended therewith, the content of the modifier (D) is preferably from 0.01 to 20 parts by weight based on 100 parts by weight of the resin composition (C).

In the case of blending the rubber material or modified rubber material with the polyamide resin composition for the purpose of improving the impact resistance, in particular, low-temperature impact resistance, the rubber material or modified rubber material is blended in an amount of from 0.1 to 100 parts by weight, and preferably from 1 to 70 parts by weight based on 100 parts by weight of the resin composition (C). If the content is less than 0.1 part by weight, the improving effect in impact resistance is not obtained, while if the content exceeds 100 parts by weight, the toughness, heat resistance, etc. are undesirably lowered.

Also, the filler used for the purposes of reinforcement and imparation of functions is blended in an amount of from 0.1 to 300 parts by weight, and preferably from 1 to 200 parts based on 100 parts by weight of the resin composition (C). If the content of the filler is less than 0.1 part by weight, the filling effect is not obtained, while if the content exceeds 300 parts by weight, the impact resistance is lowered, the characteristics inherent to the resin are lost, and the resin becomes brittle so that preferred results are not obtained.

[VII] Resin Composition and Production Method of the Molded Article Thereof

There is no particular restriction on the method of producing the polyamide resin composition in the present invention, and usually known method can be used. That is, a method of mixing the components in a solution state and evaporating off the solvent or precipitating the product in a non-solvent may be effective, but from the industrial view point, a method of kneading the components in a molten state is actually used. For melt kneading the components, a generally used melt kneading apparatus such as a Banbury mixer, an extruder, a roll, and various kinds of kneaders can be used.

At kneading, it is preferred that each resin component is previously uniformly mixed in the state of a powder or pellet by an apparatus such as a tumbler and a Henshel mixer, but if desired, mixing is omitted, and definite amounts of the respective components can be separately supplied to a kneading apparatus.

The method of producing the resin composition (C) and the composition comprising the resin composition (C) having the rubber material and/or the modified rubber material blended therewith is disclosed in JP-A-61-64741 (corresponding to U.S. Pat. No. 4,780,505), Japanese Patent Application No. 1-202419, and U.S. Pat. No. 4,315,086.

When the modifier (D) is blended with the resin composition (C) comprising the polyamide resin and other thermoplastic resin, various methods can be employed.

Specifically, a method of kneading the polyamide resin and other thermoplastic resin using a continuous kneader equipped with a means of separately supplying definite amounts of the respective components and then continuously blending the modifier (D) from a supplying means in the latter stage and a method of dry blending pellets of the resin composition (C) comprising the polyamide resin and other thermoplastic resin with the modifier (D) itself or a master batch comprising the polyamide resin and the modifier (D) and directly molding it.

The kneaded resin composition is molded by injection molding, extrusion molding, or other various methods, but the present invention also includes a method of dry blending the components at injection molding or extrusion molding without employing the previous kneading step and directly kneading the blend during the melting and working step to provide a molded article.

[VIII] Surface Treatment Method and Coating Method

Then, the surface treatment method and the coating method are explained.

The present invention is characterized in that the surface of the above-described polyamide resin composition molded article is brought into contact with water.

As a method of contacting with water, a method of coating or wiping and a method of immersion, spraying, or other means can be used.

By bringing the surface into contact with water by the above-described method, the coating properties of the surface can be greatly improved without any needs of a pre-treatment with a halogenated hydrocarbon, etc., or a per-treatment with a primer, plasma, etc.

As water used, pure water, industrial water, drinking water can be used. Since water is not toxic and incombustible, it is a very suitable solvent for environmental problems and safety as compared with other solvents.

Depending on the present invention, after bringing the surface of the molded article into contact with water, the surface is dried by air drying and can be coated with an acrylic or urethane coating composition, etc.

As a preferred coating composition used in the present invention, epoxy, polyester, acrylic, and urethane coating compositions can be used.

In particular, urethane coating compositions have flexibility and are widely used as parts of automobiles and two-wheeled vehicles.

As the urethane coating composition, coating compositions having a urethane structure, such as acrylic urethane, polyester urethane, and modified urethane, can be used.

The following Examples are intended to illustrate the present invention but not to limit it in any way.

(1) STARTING MATERIALS USED IN THE EXAMPLES AND COMPARATIVE EXAMPLES (a) Polyamide resin As the polyamide resin, commercially available 6-nylon was used.

The relative viscosity by the 98% sulfuric acid method according to JIS K6810 and the amount of functional groups at the terminal ends of the polyamide resin by the neutralization titration method were as follows.

(i) PA-1: Relative viscosity 2.04, amino group 94 mmole/kg, carboxyl group 54 mmole/kg (Nylon A-1030A, made by UNITIKA Ltd.).

(ii) PA-2: Relative viscosity 3.4, amino group 42 mmole/kg, carboxyl group 42 mmole/kg (Nylon A-1030BRT, made by UNITIKA Ltd.).

(iii) PA-3: Relative viscosity 2.18, amino group 36 mmole/kg, carboxyl group 121 mmole/kg (Nylon A-1020A-3, made by UNITIKA Ltd.).

(b) Co-modified product of polypropylene/rubber material

Two kinds of polypropylene/rubber co-modified resin compositions were produced by the following methods.

(i) After uniformly mixing 100 parts by weight of a blended product obtained by mixing commercially available homopolypropylene [Sumitomo Noblen WF299B, made by Sumitomo Chemical Company, Limited, melt flow rate 1.6 g/10 minutes (measured according to JIS K6758)] and an ethylene-propylene copolymer rubber (Esprene E111P, made by Sumitomo Chemical Company, Limited, $ML_{1+4}$ 121° C.=33, ethylene content =73% by weight) at a ratio of 24.5/12.5 with 0.5 part by weight of maleic anhydride, 1.0 part by weight of a propylene homopolymer having 8% by weight of 1,3-bis(t-butylperoxyisopropyl)benzene (Sunperox-TY13, made by Sanken Chemical Industrial Co., Ltd.) as a radical initiator supported thereon, and 0.1 part by weight of Irganox 1010 (made by Ciba-Geigy AG) as a stabilizer by a Henschel mixer, the mixture was melt kneaded by a TEX44SS-30BW-2V type twin-screw extruder (manufactured by The Japan Steel Works, Ltd.) at a temperature of 220° C. for an average residence time of 1.5 minutes, to produce a polypropylene/rubber co-modified resin composition having a melt flow rate of 14 g/10 minutes. Hereinafter, the composition is referred to as M-(PP/EPM)-1.

(ii) A polypropylene/rubber co-modified resin composition was produced in the same manner as in the production of M-(PP/EPM)-1, except that the ratio of homopolypropylene to ethylene-propylene copolymer rubber was changed to 19/12.5. Hereinafter, the composition is referred to as M-(PP/EPM)-2.

(c) Polyphenylene ether resin

In toluene and methanol was dissolved 2,6-dimethylphenol, and after adding thereto manganese chloride-ethylenediamine, oxidation polymerization was carried out at a reaction temperature of 30° C. in an oxygen atmosphere to provide a polyphenylene ether resin (hereinafter referred to as "PPE").

(d) Modified rubber material (i) Modified ethylene-propylene rubber

A modified rubber was produced by the following method. That is, 100 parts by weight of pellets of an ethylenepropylene copolymer rubber having a number average molecular weight of 60,000 and an ethylene content of 78% by weight were mixed with 2.0 parts by weight of maleic anhydride, 2.0 parts by weight of styrene, and 1.0 part by weight of a propylene homopolymer having 8% by weight of 1,3-bis(t-butylperoxyisopropyl)benzene (Sunperox-TY13, made by Sanken Chemical Industrial Co., Ltd.) as a radical initiator supported thereon by a Henschel mixer, and the mixture was melt kneaded by means of a TEX44SS-30BN-2V type diaxial extruder (manufactured by The Japan Steel Works, Ltd.) in a nitrogen atmosphere at a kneading temperature of 250° C. and an extrusion rate of 18 kg/hour, to provide a modified ethylene-propylene copolymer rubber having an addition amount of maleic anhydride of 1.5% by weight, an addition amount of styrene of 0.8% by weight, and a Mooney viscosity ($ML_{1+4}$ 121° C.) at 121° C. of 70. Hereinafter, the modified ethylene-propylene copolymer rubber is referred to as MS-EPM.

(ii) Epoxy group-containing copolymer

As the epoxy group-containing copolymer, an ethyleneglycidyl methacrylate-vinyl acetate copolymer was produced by the following method.

That is, the copolymer was produced according to the methods described in JP-A-47-23490 and JP-A-48-11388.

Using a 40-liter stainless steel-made reaction vessel equipped with an inlet for starting materials, an outlet for product, and a stirrer and capable of being controlled in temperature, copolymerization was carried out with stirring at a pressure of from 1,400 to 1,600 atms and a temperature of from 180° to 200° C., while continuously supplying ethylene, glycidyl methacrylate, vinyl acetate, a radical initiator, and a chain transfer agent.

The ethylene-glycidyl methacrylate-vinyl acetate copolymer had a composition ratio of 85/10/5 by weight. Hereinafter, the copolymer is referred to as E-GMA-VA.

(e) Styrene rubber

As the styrene rubber, commercially available products were used.

SEP: Styrene-ethylene-propylene copolymer, Kraton G1701 (made by Shell Chemical Co.).

SBS: Styrene-butadiene-styreneblock copolymer, Kraton D1101 (made by Shell Chemical Co.).

(f) Filler

As the filler, a super fine powdery talc, Micro Ace P132 (made by Nippon Talc K.K.) was used. The 50% average particle size (D50) of Micro Ace P132 was measured by the following method and found to be 2.1 μm.

Measurement apparatus: Centrifugal sedimentation type particle size distribution measurement apparatus, Type SA-CP2-20, manufactured by Shimadzu Corporation).

Revolution number: 500 r.p.m.
Liquid surface height: 3
D50 was determined by the sieving method prot.

(g) Master batch of polyamide resin and talc

Definite amounts of PA-1, PA-3, and talc were kneaded in a continuous twin-screw kneader (Type TEX44SS30BW-3V, manufactured by The Japan Steel Works, Ltd.) at an extrusion rate of 25 kg/hour and a cylinder temperature of 230° C. under bent suction to provide master pellets. As the screw, a triple-screw type rotor and an kneading disk were disposed in the subsequent zone to each of the first feed inlet and second feed inlet in the kneading zone.

(h) Master batch of modifier and polyamide resin

MB: A uniform mixture of 2.5% by weight of succinic anhydride and 97.5% by weight of PA-1 was kneaded in a continuous twin-screw extruder under the same condition as in the production of the master batch of polyamide resin and talc, to obtain pellets. The pellets are referred to as modifier MB.

(2) EVALUATION METHOD OF PHYSICAL PROPERTIES (i) Coating adhesion ratio

A cut piece having a size of 50 mm×50 mm×3 mm is cut out from the central portion of a tabular molded article having a size of of 100 mm×400 mm×3 mm.

One surface of the cut piece is spray coated with a definite coating composition and baked for drying. After 24 hours, 100 squares (10 in TD×10 in MD) having a size of 2 mm ×2 mm are cut on the coating of the sample by means of a cutter knife, and after adhering a cellophane adhesive tape of 24 mm in width (made by Nichiban Company, Limited) under pressure onto the cut squares, the adhesive tape is immediately peeled off by pulling one end thereof. In this case, the number of remaining squares is evaluated as the remaining ratio (%).

EXAMPLE 1 AND COMPARATIVE EXAMPLE 1

A mixture of M-(PP/EPM)-1 as the co-modified product of polypropylene/rubber material, PA-1 and PA-3 as polyamide 6, EGMA-VA, talc as the filler, and modifier MB (PA-1, PA-3, and talc had been previously formed into a master batch, as described above) at the ratio shown in Table 1 was pre-mixed by a rumbler for 20 minutes and pelletized by melt kneading in a TEX44 SS-30BW-2V type twin-screw extruder (manufactured by The Japan Steel Works, Ltd.) to provide a resin composition. Using the resin composition, a tabular molded article was prepared by an Sumitomo Nestar injection molding machine, Neomat 350/120SYCAP-M.

After washing the surface of the molded article obtained with drinking water, the article was air dried, the surface thereof was spray coated with an acrylic urethane coating composition, Recrack #440H (made by Fujikura Kasei Co., Ltd.) and baked for drying at 80° C. for 30 minutes, and the initial adhesion of the coated molded article was then measured. The results are shown in Table 2.

Also, the initial adhesion of a coated molded article obtained by the same procedures as above, except that the washing with drinking water was omitted. The results are also shown in Table 2.

TABLE 1

| Constituents | Composition Ratio (wt %) |
|---|---|
| M-(PP/EPM)-1 | 36.5 |
| PA: | |
| PA-1 | 10 |
| PA-3 | 39 |
| E-GMA-VA | 0.5 |
| Talc | 14 |
| Modifier MB | 6 (parts by weight) |

TABLE 2

| | Pre-treatment | Coating Composition | Initial Adhesion (%) |
|---|---|---|---|
| Example 1 | Water washing | Recrack #440H | 79 |
| Comparative Example 1 | None | Recrack #440H | 0 |

From the results shown in Table 2, it can be seen that the effect of washing is remarkable.

EXAMPLE 2 AND COMPARATIVE EXAMPLE 2

The same procedures as Example 1 and Comparative Example 1 were followed, except that M-(PP/EPM)-2 was used in place of M-(PP/EPM)-1 as the co-modified product of polypropylene/rubber material and blended at a ratio shown in Table 3. The initial adhesion of each coated article was then measured in the same manner as in Example 1 and Comparative Example 1. The results are shown in Table 4.

TABLE 3

| Constituents | Composition Ratio (wt %) |
|---|---|
| M-(PP/EPM)-2 | 31.5 |
| PA: | |
| PA-1 | 10.8 |
| PA-3 | 43.2 |
| E-GMA-VA | 0.5 |
| Talc | 14 |
| Modifier MB | 6 (parts by weight) |

TABLE 4

| | Pre-treatment | Coating Composition | Initial Adhesion (%) |
|---|---|---|---|
| Example 2 | Water washing | Recrack #440H | 99.9 |
| Comparative Example 2 | None | Recrack #440H | 5 |

EXAMPLES 3 TO 5 AND COMPARATIVE EXAMPLE 3

From a first hopper of a continuous twin-screw kneader (TEM-50, manufactured by Toshiba Machine Co., Ltd.) were charged 48 parts by weight of PPE, 4 parts by weight of MS-EPM as the modified rubber material, 4 parts by weight of SEP and 4 parts by weight of SBS as the styrene rubber, and 0.6 part by weight of maleic anhydride, and from a second hopper provided between the first hopper and a bent hole was charged 41 parts by weight of polyamide 6 (PA-2) using a metering feeder. Then, the mixture was pelletized by melt kneading at a cylinder temperature of 260° C. and a screw revolution number of 380 r.p.m., to provide a resin composition. Using the resin composition, a tabular molded article was prepared by an injection molding machine (IS-150E, made by Toshiba Machine Co., Ltd.).

The surface of the molded article obtained was treated with water by the method shown in Table 5, air dried, spray coated with an acrylic urethane series coating composition, Origiplate Z-NY (made by Origin Electric Co., Ltd.), and baked for drying at 80° C. for 30 minutes. The initial adhesion of the coated molded article was then measured. The results are shown in Table 5.

Also, a coated molded article was obtained by the same procedures as above, except that the water treatment was omitted. The initial adhesion was then measured. The results are also shown in Table 5.

EXAMPLE 6 AND COMPARATIVE EXAMPLE 4

The same procedures as in Example 4 and Comparative Example 3 were followed, except that an acrylic urethane coating composition, Soflex 5300 (made by Kansai Paint Co., Ltd.) as the coating composition. The initial adhesion of each of the coated molded articles was then measured. The results are shown in Table 5.

EXAMPLE 7 AND COMPARATIVE EXAMPLE 5

The same procedures as in Example 3 and Comparative Example 3 were followed, except that an alkyd melamine coating composition, Neoamilac #002 (made by Kansai Paint Co., Ltd.) was used as the coating material and that the baking for drying was carried out at 140° C. for 30 minutes. The initial adhesion of each coated molded article was then measured. The results are shown in Table 5.

TABLE 5

|  | Pre-treatment | Coating Composition | Initial Adhesion (%) |
|---|---|---|---|
| Example 3 | Water washing | Origiplate Z-NY | 100 |
| Example 4 | Water immersion (for one hour at normal temperature) | Origiplate Z-NY | 100 |
| Example 5 | Water immersion (for 5 hours at normal temperature) | Origiplate Z-NY | 100 |
| Comparative Example 3 | None | Origiplate Z-NY | 72 |
| Example 6 | Water immersion (for one hour at normal temperature) | Soflex #5300 | 91 |
| Comparative Example 4 | None | Soflex #5300 | 0 |
| Example 7 | Water washing | Neoamilac #002 | 80 |
| Comparative Example 5 | None | Neoamilac #002 | 0 |

EXAMPLES 8 to 10 AND COMPARATIVE EXAMPLES 6 TO 8

The same procedures as in Example 3 and Comparative Example 3 were followed, except that the baking condition for drying condition of the coating composition was changed to air drying at normal temperature, at 80° C. for 10 minutes, and at 80° C. for 20 minutes, respectively. The initial adhesion of each coated molded article was then measured. The results obtained are shown in Table 6.

TABLE 6

|  | Pre-treatment | Coating Composition | Baking Condition | Initial Adhesion (%) |
|---|---|---|---|---|
| Example 8 | Water washing | Origiplate Z-NY | Air drying (at normal temperature for one day) | 99.9 |
| Comparative Example 6 | None | Origiplate Z-NY | Air drying (at normal temperature for one day) | 64 |
| Example 9 | Water washing | Origiplate Z-NY | at 80° C. for 10 minutes | 99.5 |
| Comparative Example 7 | None | Origiplate Z-NY | at 80° C. for 10 minutes | 68 |
| Example 10 | Water washing | Origiplate Z-NY | at 80° C. for 20 minutes | 99.8 |
| Comparative Example 9 | None | Origiplate Z-NY | at 80° C. for 20 minutes | 70 |

In the light of the above, the present invention provides a surface treating method and coating method of a polyamide resin composition molded article, with a very excellent performance in coating properties and being suitable for the new chemical era without causing problems such as the above-described environmental problems including the environmental problem of the earth.

While the invention has been described in detail and with reference to specific embodiments thereof, it will be apparent to those skilled in the art that various changes and modifications can be made therein without departing from the spirit and scope thereof.

What is claimed is:

1. A surface treatment method of a polyamide resin composition molded article, which comprises bringing the surface of a polyamide resin composition molded article into contact with water and drying in air, said polyamide resin composition molded article comprising (C) 100 parts by weight of a resin composition comprising (A) from 10 to 80% by weight of a polyamide resin and (B) from 20 to 90% by weight of another thermoplastic resin; and (D) from 0 to 20 parts by weight of at least one modifier selected from a carboxylic acid having at least 2 carboxyl groups in the molecule or a derivative thereof, an amine containing at least 2 nitrogen atoms in the molecule, urea or a derivative thereof, and a low-molecular weight polyamide.

2. A coating method of a polyamide resin composition molded article, which comprises, after bringing the surface of a polyamide resin composition molded article into contact with water and drying in air, coating the surface with a coating composition, said polyamide resin composition molded article comprising (C) 100 parts by weight of a resin composition comprising (A) from 10 to 80% by weight of a polyamide resin and (B) from 20 to 90% by weight of another thermoplastic resin; and (D) from 0 to 20 parts by weight of at least one modifier selected from a carboxylic acid having at least 2 carboxyl groups in the molecule or a derivative thereof, an amine containing at least 2 nitrogen atoms in the molecular, urea or a derivative thereof, and a low-molecular weight polyamide.

3. A surface treatment method of a polyamide resin composition molded article, which comprises bringing the surface of a polyamide resin composition molded article into contact with water and drying in air, said polyamide resin composition molded article comprising (C) 100 parts by weight of a resin composition comprising (A) from 10 to 80% by weight of a polyamide resin and (B) from 20 to 90% by weight of another thermoplastic resin, having from 0 to 100 parts by weight of a rubber material and/or a modified rubber material and from 0.1 to 300 parts by weight of a filler blended therewith; and (D) from 0.01 to 20 parts by weight, based on 100 parts by weight of the blended composition, of at least one modifier selected from a carboxylic acid having at least 2 carboxyl groups in the molecule or a derivative thereof, an amine containing at least 2 nitrogen atoms in the molecular, urea or a derivative thereof, and a low-molecular weight polyamide.

4. A coating method of a, polyamide resin molded article, which comprises, after bringing the surface of a resin composition molded article into contact with water and drying in air, coating the surface with a coating composition, said polyamide resin composition molded article comprising (C) 100 parts by weight of a resin composition comprising (A) from 10 to 80% by weight of a polyamide resin and (B) from 20 to 90% by weight of another thermoplastic resin, having from 0 to 100 parts by weight of a rubber material and/or a modified rubber material and from 0.1 to 300 parts by weight of a filler blended therewith; and (D) from 0.01 to 20 parts by weight, based on 100 parts by weight of the blended composition, of at least one modifier selected from a carboxylic acid having at least 2 carboxyl groups in the molecule or a derivative thereof, an amine containing at least 2 nitrogen atoms in the molecular, urea or a derivative thereof, and a low-molecular weight polyamide.

5. A method of claim 1, wherein said polyamide resin (A) is at least one member selected from poly-$\epsilon$-caprolactam and polyhexamethyleneadipamide; and said thermoplastic resin (B) is at least one member selected from a polyolefin resin, a polyphenylene resin, and a saturated polyester resin.

6. A method of claim 2, wherein said polyamide resin (A) is at least one member selected from poly-$\epsilon$-caprolactam and polyhexamethyleneadipamide; and said thermoplastic resin (B) is at least one member selected from a polyolefin resin, a polyphenylene resin, and a saturated polyester resin.

7. A method of claim 3, wherein said polyamide resin (A) is at least one member selected from poly-$\epsilon$-caprolactam and polyhexamethyleneadipamide; and said thermoplastic resin (B) is at least one member selected from a polyolefin resin, a polyphenylene resin, and a saturated polyester resin.

8. A method of claim 4, wherein said polyamide resin (A) is at least one member selected from poly-$\epsilon$-caprolactam and polyhexamethyleneadipamide; and said thermoplastic resin (B) is at least one member selected from a polyolefin resin, a polyphenylene resin, and a saturated polyester resin.

9. A method of claim 5, wherein said polyphenylene resin of said thermoplastic resin (B) is a polyphenylene ether.

10. A method of claim 6, wherein said polyphenylene resin of said thermoplastic resin (B) is a polyphenylene ether.

11. A method of claim 7, wherein said polyphenylene resin of said thermoplastic resin (B) is a polyphenylene ether.

12. A method of claim 8, wherein said polyphenylene resin of said thermoplastic resin (B) is a polyphenylene ether.

13. A method of claim 5, wherein said polyphenylene resin of said thermoplastic resin (B) is a modified polyphenylene ether.

14. A method of claim 6, wherein said polyphenylene resin of said thermoplastic resin (B) is a modified polyphenylene ether.

15. A method of claim 7, wherein said polyphenylene resin of said thermoplastic resin (B) is a modified polyphenylene ether.

16. A method of claim 8, wherein said polyphenylene resin of said thermoplastic resin (B) is a modified polyphenylene ether.

* * * * *